UNITED STATES PATENT OFFICE.

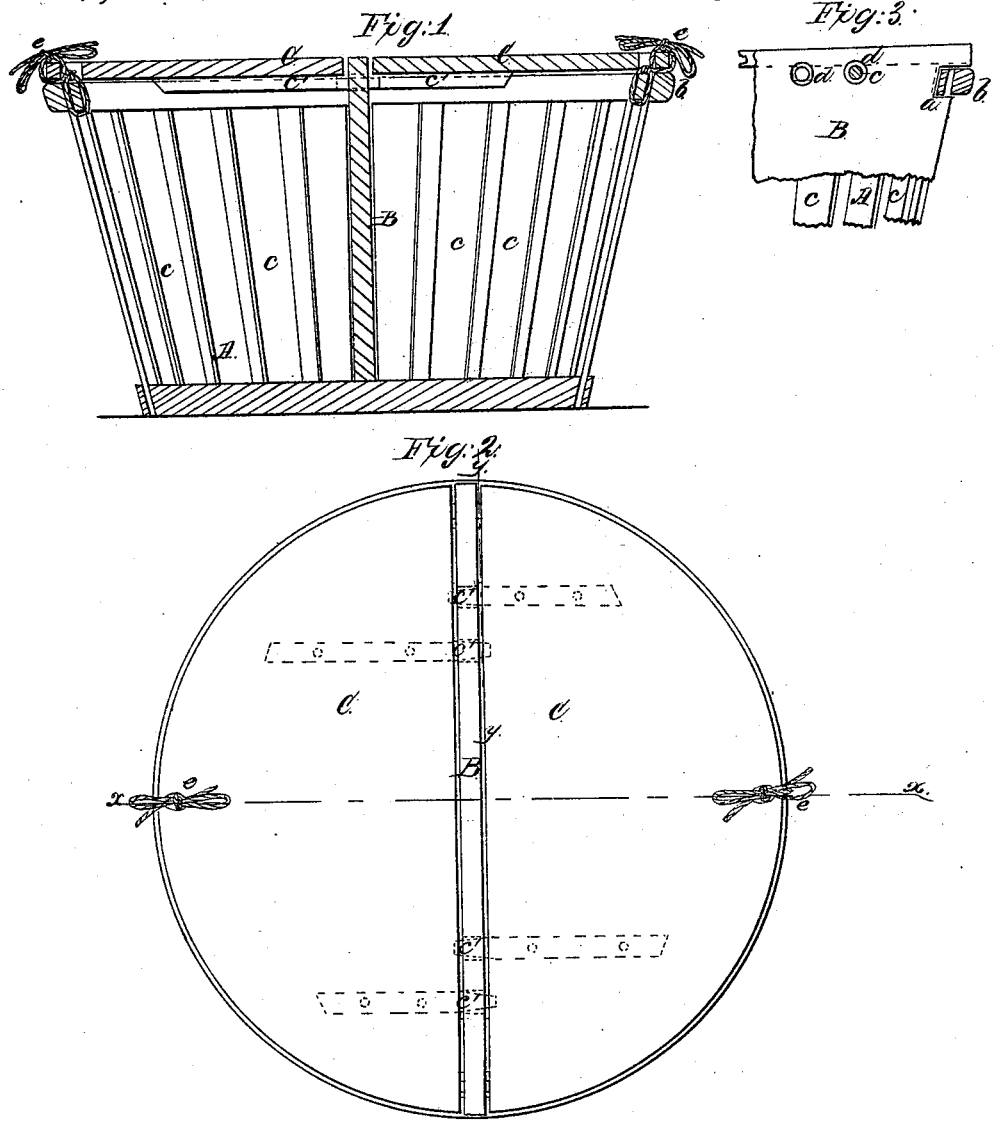

HENRY CARPENTER, OF NEW YORK, N. Y.

FRUIT-BASKET.

Specification forming part of Letters Patent No. 44,280, dated September 20, 1864.

*To all whom it may concern:*

Be it known that I, HENRY CARPENTER, of the city, county, and State of New York, have invented a new and Improved Fruit-Basket; and I do hereby declare that the following is a full, clear, and exact description thereof, which will enable others skilled in the art to make and use the same, reference being had to the accompanying drawings, forming part of this specification, in which—

Figure 1 is a vertical section of my invention, taken in the line *x x*, Fig. 2; Fig. 2, a plan or top view of the same; Fig. 3, a vertical section of a part of the same, taken in the line *y y*, Fig. 2.

Similar letters of reference indicate like parts.

This invention consists in having the basket made of double the capacity of those now used for holding peaches and other fruit, and providing the same with a central partition and two lids, as hereinafter fully shown and described, whereby the expense of transportation is reduced one-half, and the baskets rendered capable of being stowed one on the top of the other without having their contents injured.

A represents the basket, which may be constructed in the usual or in any proper way, but of double the capacity of an ordinary "peach-basket," commonly so termed.

B represents a partition, which is fitted centrally and vertically in the basket A. This partition has notches *a* made in each edge of it, near its upper end, to receive the rim *b* of the basket, as shown in Fig. 3, the edges of the partition being fitted between the bars *c* of the basket, which hold it in place. The top of the partition B extends a trifle above the rim *b* of the basket, and C C are two lids or covers of semicircular form, which are placed on each part or compartment of the basket and rest on the rim *b*. These lids or covers may be attached to the partition B by hinges, or each lid may have two bars, *c' c'*, attached to it and projecting from their inner sides to fit in holes *d* in the partition B. This latter plan would probably be preferable to hinges, as it admits of the lids or covers being readily detached when necessary. The lids or covers may be secured down on the basket by strings *e*, or any other suitable fastening. The partition B serves to prevent the fruit within the basket from being crushed or injured by the weight of articles placed upon it. Baskets constructed in this way may be piled or stowed away one on top of the other without injury to the fruit, the lids C with the partition forming a solid top; hence the baskets may be stowed away in cars and on boats more compactly than the ordinary baskets, and as freight is charged by the basket irrespective of dimensions the cost of transportation will be reduced just one-half.

The invention affords every advantage to a retail merchant, for if a purchaser desires a quantity of fruit equivalent to that contained in an ordinary basket he merely empties one compartment only of the basket.

The partition B and lids C C may be constructed of wood, and the partition B may, when the baskets are empty, be removed, as well as the lids, and the baskets compactly stowed one within the other, thereby economizing in space and reducing the expense of freight in returning empty baskets.

Having thus described my invention, I claim as new and desire to secure by Letters Patent—

A peach or fruit basket provided with a vertical central partition and lids or covers, substantially as herein shown and described.

HENRY CARPENTER.

Witnesses:
 J. P. HALL,
 WM. F. MCNAMARA.